United States Patent

[11] 3,607,980

| [72] | Inventors | Jean Claude Thomas<br>Lyon;<br>Francis Fournel, Lyon; Salomon Soussan,<br>Saint-Fons, all of France |
|---|---|---|
| [21] | Appl. No. | 680,041 |
| [22] | Filed | Nov. 2, 1967 |
| [45] | Patented | Sept. 21, 1971 |
| [73] | Assignee | Produits Chimiques Pechiney-Saint-Gobain<br>Paris, France |
| [32] | Priority | Nov. 14, 1966 |
| [33] | | France |
| [31] | | 83,489 |

[54] METHOD OF POLYMERIZING VINYL CHLORIDE WITH ETHYLENE-VINYL ACETATE COPOLYMERS
8 Claims, No Drawings

[52] U.S. Cl. ................................................ 260/878 R,
 260/884, 260/897 R
[51] Int. Cl. ....................................................... C08f 15/40,
 C08f 15/24
[50] Field of Search ........................................... 260/878

[56] References Cited
UNITED STATES PATENTS

| 3,322,858 | 5/1967 | Coarer et al. ................. | 260/876 |
| 3,330,786 | 7/1967 | Finestone et al. .............. | 260/880 |
| 3,358,054 | 12/1967 | Hardt et al. .................... | 260/878 |

FOREIGN PATENTS

| 1,381,031 | 10/1964 | France ......................... | 260/878 |

*Primary Examiner*—Murray Tillman
*Assistant Examiner*—Wilbert J. Briggs, Sr.
*Attorneys*—Dale A. Bauer, John L. Seymour and Bauer and Seymour

ABSTRACT: Resins of high shock resistance when shaped as tubes, rods, plates or the like are prepared by dissolving a copolymer of vinyl acetate and ethylene in liquid vinyl chloride, partly polymerizing another quantity of vinyl chloride with high turbulence in mass, mixing the solution of vinyl acetate-ethylene copolymer and the suspension of polyvinyl chloride in vinyl chloride, and subjecting this mixture to conditions of temperature, pressure, agitation and catalysis favorable to graft polymerization in mass of vinyl chloride on the vinyl acetate-ethylene copolymer.

METHOD OF POLYMERIZING VINYL CHLORIDE WITH ETHYLENE-VINYL ACETATE COPOLYMERS

This invention contemplates a process for preparing resins of exceptional shock resistance which are useful in forming objects such as tubes, rods and plates by molding, for instance by extrusion or shaping press, or by cutting out of the shape from a block. These are products by polymerization having a polyvinyl chloride base containing copolymers of ethylene-vinyl acetate grafted by polyvinyl chloride. A novel process is employed in making these products.

The 15 process proceeds by dissolving a copolymer of ethylene-vinyl acetate in liquid vinyl chloride, partly polymerizing another quantity of vinyl chloride to about 7 to 15 percent completion, preferably from 8 to 12 percent, with high turbulence, in mass, the solution of the copolymer and the suspension of the polyvinyl chloride in its monomer being mixed and subjected to conditions of temperature, pressure, agitation and catalysis favorable to polymerization in mass.

In this specification polymerization includes both homopolymerization and graft polymerization of vinyl chloride; Mines 2,715,588. molybdenum, nickel, polymerization in mass or in bulk are equivalent terms meaning polymerization in the absence of adjuvants other than the usual trace of catalyst.

According to a first variant of the general method of procedure the copolymer is dissolved in liquid vinyl chloride at 15° to 30° C., preferably 20° to 25° C. under pressure sufficient to keep the vinyl chloride largely in liquid phase, which also contains a typical catalyst for the graft polymerization. As such catalysts are not per se a part of the invention, and have been published elsewhere, they need not be repeated here. The solution is then mixed with a suspension of partly polymerized vinyl chloride in vinyl chloride. The temperature, pressure and agitation of this mixture are then adjusted to produce rapid and efficient graft polymerization in mass.

In a second variant of the general method of carrying out the invention the copolymer is dissolved in liquid vinyl chloride at 40° to 70°, preferably 50° to 60°, the solution then being mixed with a suspension of partly polymerized vinyl chloride in vinyl chloride, which contains the catalyst necessary for the graft polymerization.

The composition of the copolymer is of some importance, the vinyl acetate constituting between 20 and 80 percent and the ethylene the remainder, the vinyl acetate preferably constituting 30 to 50 percent by weight of the prepolymer. A copolymer of 33 percent vinyl acetate and 67 percent ethylene, and a copolymer of 45 percent vinyl acetate and 55 percent ethylene have been particularly satisfactory.

The reaction mass may contain from 1 to 30 percent by weight, preferably 3 to 15 percent, of the copolymer based on the total weight of vinyl chloride monomer which is present during the dissolving of the copolymer and during the stage of partial polymerization of the vinyl chloride. Particularly favorable results are obtained when the partial polymerization of vinyl chloride is carried out on 30 to 90 percent, preferably 40 to 60 percent, by weight of the total vinyl chloride monomer used in the process.

Although many catalysts which produce useful results have been published in appropriate literature, particularly favorable results have been obtained with azobis-isobutyronitrile, lauroyl peroxide, isopropylperoxydicarbonate; acetyl-cyclohexanesulfonyl peroxide. It is within the scope of the invention to use more than one copolymer of vinyl acetate-ethylene in the starting solution. This variant in the process produces interesting variations in the properties of the products.

The products have particularly high resistance to shock and particularly high resistance to shock combined with excellent conservation of other mechanical properties after prolonged exposure to ultraviolet light and good resistance to the action of solvents such as aromatic hydrocarbons and chlorinated hydrocarbons.

The following examples illustrate the invention without detracting from the generality elsewhere herein expressed.

EXAMPLE 1

A vertical prepolymerizer autoclave of stainless steel having a capacity of 200 l. provided with a Typhon agitator received 110 kg. of vinyl chloride monomer and 6.93 g. of acetyl-cyclohexanesulfonyl peroxide which provided 0.0005 percent of active oxygen by weight of the vinyl chloride subjected to prepolymerization. The apparatus was purged by releasing 10 kg. of monomer, the temperature was raised to 62° C. producing a relative internal pressure of 9.3 bars and was kept under these conditions for 1 hour 15 minutes, the agitator running at 700 r.p.m. In a horizontal stainless autoclave of 500 l. having a blade-type agitator 10 kg. of ethylene-vinyl acetate copolymer, containing 45 percent vinyl acetate and 90 g. of azobis-isobutyronitrile, were dissolved in 115 kg. of vinyl chloride. The temperature during dissolving was 25° C. After 1 hour 15 minutes of agitation, the copolymer being completely dissolved, the contents of the prepolymerizer were transferred to the horizontal autoclave which was then purged by releasing 15 kg. of vinyl chloride monomer. The temperature of the reaction medium was then carried to 60° C. and a relative pressure of 9.2 bars where it was kept under agitation of 30 r.p.m. for 10½ hours. After the polymerization the autoclave was vented to release the unreacted monomer and 172 kg. of resin (a yield of 81 percent) were obtained. This resin contained 10 kg. of ethylene-vinyl acetate copolymer grafted by polyvinyl chloride (5.8 percent in weight) and its apparent density was 0.6. Its granulometry is indicated in Table I.

The finished products obtained by calendering, extruding, molding or the like have excellent shock resistance as evidenced by the following tests of Charpy type. A tube prepared by extrusion with a wall thickness of 2 mm. is cut open along the generatrix and pressed flat for 5 minutes at 160° C. to a length of 2/g. 150 mm., a width of 12.5 mm., and a thickness of 2 mm.; a notch 2.5 mm. deep is cut into one side edge of the test piece. The ends of the test piece are clamped to a selected distance apart and a Charpy pendulum is directed against the edge of the test piece opposite the notch with an energy of 40 kg. $f$/cm$^2$. Shock resistance is given by the formula: $R=W1\,S$, $R$ being kilogram-force in centimeters per square centimeter, $W$ being the energy absorbed by the shock in kilogram-force centimeter, and $S$ equals $h \times l$ in which $h$ is the thickness of the test piece and $l$ the distance between the bottom of the notch and the external face of the opposite edge. Twenty test pieces were subjected to each test. The shock resistance of the test piece made from the resin of this invention was 20 kg. force per square centimeter at 20° C., 10 kg. force cm./cm.$^2$ at 0° C. and 7 kg. force cm./cm.$^2$ at −20° C. Additional tests carried out on test pieces of identical size and shape made from vinyl chloride homopolymers prepared under like conditions had only the following shock resistance: 5 kg. $f$ cm./cm.$^2$ at 20° C., 4 kg. $f$ cm./cm.$^2$ at 0° C., and 3.5 kg. $f$ cm./cm.$^2$ at −20° C.

After identical periods of exposure to ultraviolet light of identical intensity the shapes made from the resins of example 1 showed, for no exposure, 20 kg. $f$ cm./cm.$^2$ for this invention and 5 kg. $f$ cm./cm.$^2$ for the homopolymer; for 500 hours of exposure 15 kg. $f$ cm./cm.$^2$ for this product, 5 kg. $f$ cm./cm.$^2$ for the homopolymer; for 1,000 hours of exposure 7 kg. $f$ cm./cm.$^2$ for this product and 4.5 kg. $f$ cm./cm.$^2$ for the homopolymer. It is therefore apparent that the new products are superior after exposure to ultraviolet light.

EXAMPLE 2

The prepolymerization was carried out as in example 1. 115 kg. of vinyl chloride and 10 kg. of vinyl acetate-ethylene copolymer were mixed in a horizontal autoclave, the temperature of which was raised to 62° C. for 5 minutes, the agitator of blade type rotating at 15 30 r.p.m. 90 g. of azodiisobutyronitrile were introduced and the contents of the prepolymerizer were transferred to it. The horizontal autoclave was purged by the release of 15 kg. of vinyl chloride monomer, the temperature was raised to 60° C. and maintained for 10 hours 40 minutes with agitation at 30 r.p.m. The unreacted monomer was released and 172 kg. of resin were discharged. The granulometry was as in Table II. The shock tests on prepared test pieces were very close to the figures for the product of example 1.

EXAMPLE 3

Procedure was as in example 2 but the ethylene-vinyl acetate copolymer contained only 33 percent of vinyl acetate. The yield of the operation and the qualities of the product were similar to those of examples 2.

EXAMPLE 4

The process was as in example 2 except that 8.5 kg. of copolymer containing 45 percent vinyl acetate replaced the 10 kg. of that example. 170 kg. (a yield of 81 percent) of resin containing 5 percent of grafted vinyl acetate-ethylene copolymer were obtained. The qualities of the resin were extremely close to those of example 2 and the resistance to shock as measured in example 1 was 15 kg. $f$ cm./cm.$^2$ at 20° C., 9 kg. $f$ cm./cm.$^2$ at 0.° C., and 6 kg. $f$ cm./cm.$^2$ at −20° C. These values showed noticeable decrease after prolonged exposure to ultraviolet light.

TABLE I

| Screens: Apertures in microns | 630 | 500 | 400 | 315 | 250 | 200 | 160 | 100 |
|---|---|---|---|---|---|---|---|---|
| Percent fallthrough | 98 | 97 | 95 | 93 | 92 | 80 | 50 | 1 |

TABLE II

| Screens: Apertures in microns | 630 | 500 | 400 | 315 | 250 | 200 | 160 | 100 |
|---|---|---|---|---|---|---|---|---|
| Percent fallthrough | 99 | 99 | 98 | 95 | 94 | 82 | 25 | 0 |

It will be apparent from the that the resins of this class have not only superior resistance to shock, compared to polyvinyl chloride, but also superior resistance after prolonged exposure to ultraviolet light.

As many apparently widely different embodiments of the present invention may be made without departing from the spirit and scope thereof, it is to be understood that the invention is not limited to the specific embodiments.

What is claimed is:

1. A method of manufacturing a granular resin substantially free of fine powder and having high shock resistance and resistance to ultraviolet light, which comprises the steps of homopolymerizing, in mass, vinyl chloride by turbulently agitating a liquid body of vinyl chloride containing a catalyst until about 7 percent to 15 percent of the vinyl chloride has been polymerized and a suspension of polyvinyl chloride in its monomer is formed, dissolving a copolymer of vinyl acetate and ethylene containing from about 20 percent to 80 percent of vinyl acetate, in monomeric vinyl chloride, mixing the solution of the copolymer with the suspension of the homopolymer, the quantity of copolymer constituting from about 1 percent to 30 percent of the total quantity of vinyl chloride, subjecting the mixture consisting essentially of the copolymer, the homopolymer and the vinyl chloride and catalyst to polymerization while subjecting the mixture to nonturbulent agitation, and recovering a resin in granular form substantially free of powder than 100 microns.

2. A process according to claim 1 in which the copolymer is dissolved in liquid vinyl chloride containing polymerization catalyst at a temperature of from 15° to 30° C.

3. A process according to claim 1 in which the copolymer is dissolved in liquid vinyl chloride free of catalyst at a temperature of from 40° to 70° C.

4. A process according to claim 1 in which the copolymer contains from about 30 percent to 50 percent of vinyl acetate.

5. A process according to claim 4 in which said copolymer contains about 33 percent vinyl acetate.

6. A process according to claim 4 in which said copolymer contains about 45 percent vinyl acetate. optimum with composition extraction 7. A process according to claim 1 in which the weight of vinyl chloride subjected to said first step of homopolymerization is about 30 percent to about 90 percent of the weight of total vinyl chloride used.

8. A process according to claim 1 in which the catalysts used in the polymerizations are selected from the group consisting of azobisisobutyronitrile, lauroyl peroxide, isopropylperoxydicarbonate, and acetyl-cyclohexanesulfonyl peroxide.

UNITED STATES PATENT OFFICE
CERTIFICATE OF CORRECTION

Patent No. 3,607,980  Dated September 21, 1971

Inventor(s) Jean Claude Thomas, Francis Fournel, Salomon Soussan

It is certified that error appears in the above-identified patent and that said Letters Patent are hereby corrected as shown below:

Column 1, line 7, change "by" to -- of --; line 11, change "15" to -- novel --; line 21, cancel "Mines, 2,715,588. molybdenum, nickel,". Column 2, line 34, cancel "2/g."; line 40, change "R=W1 S" to --R= $\frac{W}{S}$ --; line 46, change "piece" to -- pieces --; line 69, change "5 minutes" to -- 15 minutes --; line 70, cancel "15". Column 3, line 10, change "examples" to -- example --; line 21, change "0.°C." to -- 0°C. --; line 36, after "the" insert -- examples --. Column 4, line 20, after "powder" insert -- smaller --; lines 32 and 33, cancel "optimum with composition extraction".

Signed and sealed this 28th day of March 1972.

(SEAL)
Attest:

EDWARD M. FLETCHER, JR.
Attesting Officer

ROBERT GOTTSCHALK
Commissioner of Patents